(12) United States Patent
Hakala et al.

(10) Patent No.: US 7,367,158 B2
(45) Date of Patent: May 6, 2008

(54) FIXING AGENT IN THE FORM OF AN OIL/WATER TYPE EMULSION OR SUSPENSION, AND PREPARATION OF THE SAME

(75) Inventors: Marja-Riitta Hakala, Söderkulla (FI); Pekka Lukkarinen, Espoo (FI); Jari Peltonen, Lahela (FI); Heikki Hero, Espoo (FI)

(73) Assignees: Neste Oil Oyj, Neste Oil (FI); Kemira Growhow Oyj, Helsinki (FI)

( * ) Notice: Subject to any disclaimer, the term of this patent is extended or adjusted under 35 U.S.C. 154(b) by 7 days.

(21) Appl. No.: 10/468,029

(22) PCT Filed: Feb. 13, 2002

(86) PCT No.: PCT/FI02/00112

§ 371 (c)(1),
(2), (4) Date: Jan. 7, 2004

(87) PCT Pub. No.: WO02/063941

PCT Pub. Date: Aug. 22, 2002

(65) Prior Publication Data

US 2004/0096471 A1 May 20, 2004

(30) Foreign Application Priority Data

Feb. 14, 2001 (FI) .................... 20010279

(51) Int. Cl.
*A01C 1/06* (2006.01)
(52) U.S. Cl. ........................................ 47/57.6
(58) Field of Classification Search ............... 47/59 S, 47/48.5, 57.6, 58.1 R, 58.1 SE, 58.1 SC, 47/DIG. 9–DIG. 11
See application file for complete search history.

(56) References Cited

U.S. PATENT DOCUMENTS

| | | | |
|---|---|---|---|
| 4,192,095 A | | 3/1980 | Haslam et al. |
| 4,251,952 A | | 2/1981 | Porter et al. |
| 4,761,423 A | | 8/1988 | Szego et al. |
| 4,931,061 A | * | 6/1990 | Young .................... 47/57.6 |
| 4,941,924 A | * | 7/1990 | Merritt .................... 106/285 |
| 5,683,957 A | * | 11/1997 | Huang et al. ............ 504/100 |
| 5,725,630 A | * | 3/1998 | Roberts et al. ............ 71/11 |
| 5,750,466 A | * | 5/1998 | Wedegaertner et al. ..... 504/100 |
| 6,254,654 B1 | * | 7/2001 | Van Barneveld ............ 71/8 |
| 6,318,023 B1 | * | 11/2001 | Yamashita ................ 504/117 |
| 2001/0022047 A1 | * | 9/2001 | Krysiak et al. ............ 47/58.1 |

FOREIGN PATENT DOCUMENTS

| WO | WO 93/25078 | 12/1993 |
|---|---|---|
| WO | WO 01/45489 | 6/2001 |

OTHER PUBLICATIONS

Anokhi, "Natural dying", www.anokhi.com/html/natural_dyeing.html.*

* cited by examiner

*Primary Examiner*—Son T. Nguyen
(74) *Attorney, Agent, or Firm*—Young & Thompson

(57) ABSTRACT

A fixing agent in the form of an oil/water type, lamellar emulsion or suspension in which the aqueous phase is the principal component, the aqueous phase containing water and a byproduct of agriculture or fermentation and the oil phase containing oil and emulsifiers. The emulsion or suspension is prepared by adding an aqueous solution to the oil phase in order to produce a water/oil type emulsion or suspension, by adding a portion of the aqueous phase in order to produce an inverse oil/water type emulsion or suspension, and by thereafter mixing the oil/water type emulsion or suspension with the remainder of the aqueous phase.

15 Claims, No Drawings

FIXING AGENT IN THE FORM OF AN OIL/WATER TYPE EMULSION OR SUSPENSION, AND PREPARATION OF THE SAME

BACKGROUND OF THE INVENTION

The invention relates to a fixing agent in the form of an oil/water type, lamellar emulsion or suspension, which fixing agent can be used for fixing a fertilizer powder to the surfaces of plant seeds. The invention also relates to a method for preparing such a fixing agent.

The rapidity with which the roots of a plant reach the fertilizer has great significance for the ability of the plant to take up the nutrients present in the fertilizer and for the success of the initial development and growth of the plant in the first three weeks.

The quantities of the principal nutrients (N, K, P, Ca, S, Mg) passing from fertilizers into plants, i.e. the efficiency of the nutrients, usually vary from a few percent to 70-80 percent. The efficiency of phosphorus in particular is low, approx. 5-20%. The efficiencies of trace elements (B, Co, Cu, Fe, Mn, Mo, Zn, Cl) are often even lower than this.

The method by which the fertilizer is spread, i.e. how far from the seed the fertilizer is deposited, affects the ability of the plant to utilize the nutrients. The nutrients in a fertilizer deposited far from the seed, for example at a distance of 6 cm from it, may have time to react with soil minerals and to form poorly soluble compounds even before the roots of the plant have reached the location of the fertilizer.

When, for example, phosphorus fertilization is carried out, as described above, by conventional broadcasting of the fertilizer on the soil surface or by mixing it into the surface layer of the soil, the phosphorus efficiency is 5-10%. If the fertilizer is spread by row application or tape application at a specified distance from the seed, the phosphorus efficiency is approx. 10%.

A somewhat better phosphorus efficiency is achieved when the phosphorus fertilizer is deposited in the immediate vicinity of the seed or when the seed is coated with the fertilizer. In this case the efficiencies are, respectively, 15% and 20%.

The coating of plant seeds for various reasons has long been a known technology. There are different surface treatments, beginning from the simple and conventional seed dressing with biocides to combat plant diseases and noxious insects. In this case the seeds as such are treated with a fine-ground active agent or a powder mixture containing it, or the active agent is dissolved or slurried in a suitable solvent, often water or an organic solvent, and the seeds are then treated with the obtained solution or slurry.

From patent publication U.S. Pat. No. 4,761,423 there is known a wet seed dressing method wherein the seeds are impregnated with an emulsion that contains water, oil, an emulsifier and a biocide.

Coating of seeds has also been used for delaying the germination of seeds. Polymers have been used as fixing agents also in the coating of seeds with substances having other effects. Coating may, for example, improve the ability of the seeds to withstand drought, heat, soil salinity, or other external stress factors.

With the help of coating, for example, lightweight seeds of rice can be rendered heavier, whereupon they will not be so easily carried by water or wind; see, for example, patent publication U.S. Pat. No. 4,192,095.

It is also generally known to add nutrients to a coating in order to promote plant growth.

Grass seeds have been treated with, for example, lime or talc in order to ensure the establishment of a lawn (Scott 1975). The coating of seeds with nutrients is discussed in several studies (e.g. Heydecker and Coolbear 1977, Rebafka et al. 1983, Scott et al. 1987). The greatest problems have been a poor germination percentage of the seeds, especially when oil has been used as the fixing agent, and poor attachment of nutrients to the seed surface when aqueous solutions have been used.

A great deal of research has been conducted in order to solve these problems. Various fixing agent compositions have been experimented with for the fixing of nutrients or other growth-promoting substances or compositions to the surfaces of plant seeds.

In particular, the usability of various polymers has been experimented with. It is, for example, a known method to coat seeds with water-soluble polymers such as starch, methyl cellulose and gum arabic. The greatest disadvantage is the large amount of water associated with the use of these polymers. The handling of a large amount of water requires special apparatus, and the coating process is slow. In order to prevent the wetting of the seeds, the seeds must often be dried at a low temperature. The above-mentioned polymers often form a hard, easily breaking coat around the seeds.

Patent publication WO 9325078 describes a composition used for the coating of seeds, which composition contains a polysaccharide hydrolysate, for example, carboxymethyl cellulose or carboxymethyl starch hydroxylate. The aqueous solutions of these may also be sprayed in the form of relatively concentrated aqueous solutions (30%) onto the seed surfaces.

The use of water-insoluble polymers, on the other hand, usually requires the use of an organic solvent, in which case a large solvent amount may promote the penetration of the polymer into the seed. It is also possible to use aqueous suspensions of these polymers for the treatment of seeds. For example, CA PLUS 112:17756 (PL 146138) and CA PLUS 122:49097 (PL 159474) describe such an application.

Patent publication U.S. Pat. No. 4,251,952 describes seeds coated with a mixture of a water-insoluble polymer and sugar. The polymers used are various commercial poly- or copolymers.

From unpublished patent application FI 19992768 (Kemira Agro Oy) there is known a composition intended for the surface treatment of seeds, the composition comprising a fixing agent layer made up of an oil/water emulsion and a layer of fertilizer powder. The fixing agent mixture used for forming the fixing agent layer may also contain a fluid byproduct of agriculture or fermentation.

In addition to the disadvantages already stated above, the prior-known methods may also have the disadvantage of stickiness of the coated seed surfaces, causing the seeds to stick together and giving the seeds poor flow properties. The apparatus required for the handling of the seeds also becomes easily soiled. A coating too moist, for its part, may cause premature germination of the seeds. The prior-known methods also have the disadvantage of incomplete or non-uniform adhesion of the active agent to the seeds and/or its poor retention on seed surfaces.

SUMMARY OF THE INVENTION

According to the present invention there is provided a fixing agent in the form of an oil/water type, lamellar emulsion or suspension, wherein the aqueous phase is the principal component, the aqueous phase containing water and a byproduct of agriculture or fermentation, and the oil phase containing oil and emulsifiers, and the fixing agent is prepared by adding an aqueous solution to an oil phase in order to produce a water/oil type emulsion or suspension, by adding a portion of the aqueous phase to produce an inverted oil/water type emulsion or suspension, and by thereafter mixing the said oil/water type emulsion or suspension with the remainder of the aqueous phase.

The said fixing agent may contain aqueous phase 50-95% by weight, oil phase 5-50% by weight, preferably aqueous phase 70-90% by weight and oil phase 10-30% by weight.

The said aqueous phase may contain water and a byproduct of agriculture or fermentation at a weight ratio of 1:4-4:1, preferably 3:7-7:3.

The fixing agent according to the invention may additionally contain other ingredients, such as a preservative, e.g. potassium sorbate, and/or a stabilizing agent, which may be a pH control agent, such as phosphoric acid. Stabilization of the emulsion or suspension structure is achieved under the effect of the stabilizing agent. It is also possible to use organic acids, such as citric acid or oxalic acid, as the stabilizing agent.

The said byproduct of agriculture or fermentation is preferably a fluid byproduct of agriculture or fermentation, for example molasses, such as root or cane molasses, vinasse or syrup, or a mixture thereof. The said byproduct of agriculture or fermentation may also be a solid product. The said fluid byproducts contain varying amounts of water. This water amount is included in the amount of the said byproduct.

The said oil may be a biodegradable or readily biodegradable animal or vegetable oil or mineral oil, such as white oil, or a mixture thereof.

The said emulsifiers comprise emulsifiers suitable for this purpose. In particular, the said emulsifiers comprise two different emulsifiers, of which one is a lipophilic emulsifier having an HLB (hydrophilic lipophilic balance) value within the range 2-8, preferably approx. 4, and the other is a hydrophilic emulsifier having an HLB value within the range 12-16, preferably approx. 15.

The amount of lipophilic emulsifier is preferably approx. 0.5-2% by weight, and especially preferably approx. 1% by weight. The amount of hydrophilic emulsifier is preferably approx. 1.5-4% by weight and especially preferably approx. 3% by weight. The total emulsifier amount is preferably approx. 2-6% by weight. These amounts have been calculated from the weight of the final-product emulsion or suspension.

The fixing agent according to the invention can be used for fixing a fertilizer powder to the surfaces of plant seeds. Owing to the composition and structure of the fixing agent according to the invention, the adhesion of the fertilizer powder to seed and its retention on the surfaces of seeds are excellent. The fixing agent may also contain the polymers conventionally used as fixing agents in the coating of seeds, mentioned also in the description of the state of the art.

The size of the seeds to be surface-treated and the type of their surface, which are properties specific to a plant species, affect the quantity of fixing agent that is required for fixing the desired amount of fertilizer powder to the seed surface. Preferably, the fixing agent is used in an amount of 0.5-5 parts by weight per 100 parts by weight of seeds.

According to the invention there is also provided a method for preparing a fixing agent in the form of an oil/water type, lamellar emulsion or suspension that contains water, a byproduct of agriculture or fermentation, oil and emulsifiers, the method comprising the following steps:

i) an aqueous phase which contains water and a byproduct of agriculture or fermentation is formed, ii) an oil phase which contains oil and emulsifiers is formed, iii) an aqueous solution is added to the oil phase in order to produce a water/oil type emulsion or suspension, iv) a portion of the said aqueous phase is added to the said water/oil type emulsion or suspension to produce an inverted oil/water type emulsion or suspension, and v) the emulsion or suspension obtained from step iv) is mixed with the remainder of the aqueous phase in order to form the desired emulsion or suspension.

The method according to the invention preferably comprises an additional step wherein vi) a stabilizing agent is added to the emulsion or suspension obtained from step v).

If it is desired to incorporate a preservative into the fixing agent, the preservative is added to the said aqueous phase.

The aqueous phase added in step iii) may be mainly water or a portion of the said aqueous phase. The adding of the said aqueous solution may be carried out under vigorous agitation by means of, for example, an injection pump or a homogenizer, which may be based on ultrasound technology or mechanical emulsification technology. The amount of the said aqueous solution may be 2-10% by weight, calculated from the weight of the final product emulsion or suspension. In step iii) the temperature of the oil phase may be 30-50° C., preferably approx. 40° C., and the temperature of the aqueous solution may be higher than this, preferably 35-55° C.

In step iv), aqueous phase is added in such an amount that in the water/oil emulsion or suspension there occurs a phase change to the oil/water type. In this case the amount of aqueous phase added is preferably equal to or greater than the amount of the oil phase. The temperature may be 30-50° C., preferably 37-45° C., and especially preferably approx. 40° C.

In the production method according to the invention, the forming of water-oil layers is ensured by preparing in the first step a water/oil type emulsion or suspension and by inverting it in the second step to the oil/water type. In this case the final emulsion or suspension is of the type oil/water, in which the aqueous phase is the principal component in the medium in which the oil-water layer structures are emulsified, forming lamellar structures. For the stability of the product it is essential that aqueous phase-oil phase layers be produced. The obtained product is characterized in that water is bound with the help of emulsifiers also to the interfaces formed by oil and water. The product has excellent adhesion to surfaces to be coated.

DETAILED DESCRIPTION OF THE PREFERRED EMBODIMENTS

EXAMPLE 1

Preparation of an Oil/Water Emulsion Which Contains Molasses

A. A water amount which is 37% by weight of the production batch is measured. A preservative (potassium sorbate), 0.3% by weight of the production batch, is mixed with the water. 4% by weight of this aqueous mixture is separated for later use, item D.

B. An aqueous phase is prepared by heating aqueous mixture A to 50° C. and by adding molasses at room temperature (T=15-45° C.), preferably 35° C., in an amount of 50% by weight of the production batch. The mixture is homogenized by circulation.

C. An oil phase is prepared by placing, in a separate vessel, white oil in an amount of 10% by weight of the production batch. The said oil is a colorless, odorless, catalytically hydroisomerized and dewaxed oil that contains hydrogenated hydrocarbons high in isoparaffins. To the oil there are added surface active components:
lipophilic emulsifier (HLB value approx. 4) 1% by weight of the production batch and
hydrophilic emulsifier (HLB value approx. 15) 3% by weight of the production batch.
The oil and the emulsifiers are mixed at 40° C. until homogeneous.

D. Aqueous mixture, T=45° C., from item A is added to the oil phase, T=40° C. The amount of this aqueous mixture is 4% by weight of the production batch. The adding of the aqueous mixture is carried out under vigorous agitation by means of an injector pump or a homogenizer, which may be based on ultrasound technology or mechanical emulsification technology.

E. Aqueous phase B is added to oil phase D in such an amount that in the water/oil emulsion (W/O emulsion) there occurs a phase change to the O/W type. This phase change is seen as a decrease in viscosity after an increase. The temperature must be 37-50° C., preferably 40° C. Aqueous phase B is required in at least the same amount as oil phase C.

F. O/W type emulsion E is added to the remaining aqueous phase B by cautious circulation, by avoiding any unnecessary charge of energy.

G. Finally an acid phosphoric acid 0.3% of the production batch, is added. The acid is first diluted in a portion of pure water (taken into account in the total water amount) and is mixed cautiously by circulation. Excessive energy is to be avoided. For example, when a 1000-liter batch is being prepared, 3 liters of acid is diluted in 10 liters of water.

The product prepared in the manner described above is designed in particular for use as a binding coating for seed grain coating needs. The raw materials of the product have been selected carefully considering the purity and biodegradability requirements of the agricultural and food chain.

| Physical properties of product: | typical | limits |
|---|---|---|
| density (15° C.) | 1.1 kg/m$^3$ | 1.05–1.20 kg/m$^3$ |
| viscosity (15° C.) | 17 cSt | 15–250 cSt |
| pH | 5.5 | 5.0–6.0 |
| refractometer reading ATAGO N2 (28–62%) | 44% | 40–50% |

The product is suited for being spread by spraying. Shelf life: 4-22° C. at minimum 6 months.

EXAMPLE 2

Preparation of Oil/Water Emulsion Which Contains Molasses

The oil phase already contains the emulsifiers and 4% by weight of water, in which case the product is moderately resistant to freezing temperatures and is easy to store.

The aqueous phase is prepared by adding to water potassium sorbate, 0.3% by weight, and molasses, T=40° C.

A portion of this aqueous phase is heated to a temperature higher than the oil phase, approx. 5° C. is a sufficient difference. The amount of the aqueous phase heated must be at least the amount of the oil phase in volume units.

The warm aqueous phase is emulsified into the oil phase in such an amount that there is a phase change to the O/W type, in which case the viscosity begins, after a rise, to decrease when aqueous phase is being added.

This O/W type emulsion can, under slight agitation, be added to the remainder of the aqueous phase (mixture of water and molasses).

Finally there is added phosphoric acid, 0.3% by weight, which is diluted with water at a ratio of 3/10. The water used for this is taken into account in the total water amount. Mixing is carried out using low-energy circulation.

EXAMPLE 3

Effect of Molasses Added to the Oil/Water Emulsion on the Emergence of Wheat Seeds The effect of the molasses amount present in the oil/water emulsion, used for the surface treatment of seeds, on the emergence of wheat seeds was studied in emergence tests carried out in field soils when the seeds had been treated with emulsions containing molasses, water and oil in different proportions.

For purposes of the test, a series of molasses-containing oil/water emulsions were prepared by the procedure described in Example 1. Each emulsion contained 25% by volume (v/v) of a biodegradable oil and additionally so much molasses that in the completed emulsions the volume ratio of oil/water to molasses was 4:0, 3:1, 2:2, 1:3 and 0:4.

For introducing the emulsion onto the seed surfaces, the seeds were treated in a commercial test seed-dressing device (Hege). From each surface-treated batch of seeds, 4×100 seeds were planted to germinate at a depth of 4 cm in 1-liter plastic pots filled with field soil. The controls were 100 untreated, similarly planted seeds. Each pot was watered at fixed intervals to maintain the soil moisture constant. When 11 days had elapsed from the planting, the emergence percentage was determined using the standard 5.4.A.3 defined by ISTA. The effect of the amount of molasses in the oil/water emulsion introduced onto the seed surface on the emergence of wheat seeds is shown in Table 1.

TABLE 1

Effect of the aqueous oil to molasses mixing ratio on the emergence of wheat, data in table form

| Test member | Emergence % |
|---|---|
| Untreated | 93 |
| Molasses | 93 |
| Molasses:water + oil (1:3) | 89 |
| Molasses:water + oil (2:2) | 95 |
| Molasses:water + oil (3:1) | 94 |
| Water + oil | 81 |

The results show that the adding of molasses to the oil/water emulsion significantly promotes the emergence of wheat. Furthermore, the adhesion of fertilizer powder to seed surfaces was studied with the emulsions according to the example. A molasses/oil/water emulsion fixed the fertilizer powder uniformly and better than a mere oil/water emulsion, and the technical quality was better.

EXAMPLE 4

Effect of Molasses Added to Oil/Water Emulsion on the Adhesion of Fertilizer Powder to Seeds and on its Retention on Them For purposes of the test, a series of molasses-water solutions and oil/water emulsions were prepared. The emulsions were prepared by the procedure described in Example 1. The oil/water volume ratio in the emulsions was 1:3.

Barley grains were treated with fixing agents in the manner described in Example 3. The grains treated in this manner were coated with monopotassium phosphate (MKP). The amount of moistener was 2% and the amount of MKP was 8% of the weight of the grains. The test results are shown in Table 2.

TABLE 2

| Test member | Adhesion % | Retention % | Grade |
|---|---|---|---|
| Untreated | — | — | — |
| Oil/water emulsion | 100 | 67 | Non-uniform adhesion |
| Molasses:water 1:1 | 100 | 85 | Result uniform |
| Molasses:water 2:1 | 100 | 93 | Result uniform** |
| Molasses:oil/water emulsion 1:1 | 100 | 88 | Result uniform* |

*)Does not clog the seeding machine
**)Sticks to the wheel of the seeding machine The results show that the adding of molasses to the oil/water emulsion significantly improves the retention of the fertilizer powder on the surface of seeds.

LITERATURE

Heydecker, W and Coolbear, P. 1977. Seed treatments for improved performance—survey and attempted prognosis. Seed Sci. and Technol. 5:353-425.

Rebafka, F. -P., Batino, A. and Marschner, H. 1993. Phosphorus seed coating increases phosphorus uptake, early growth and yield of pearl millet (*Pennisetum glaucum* (L). R. Br.) grown on an acid sandy soil in Niger, West Africa. Fert. Res. 35: 151-160.

Scott, J. M. 1975. Effects of seed coating on establishment. N.Z. Journal of Agricultural Research 18:59-67.

Scott, J. M., Jessop, R. S., Steer, R. J. and Mclachlan, G. D. 1987. Effect of nutrient seed coating on the emergence of wheat and oats. Fert. Res. 14: 205-217.

International Seed Testing Association (ISTA). 1996. Seed Sci. & Technol. 24, Supplement. International Rules for seed testing. Zurich, Switzerland.

The invention claimed is:

1. A fixing agent for fixing fertilizer to seeds, comprising:

an oil/water lamellar emulsion or suspension wherein an aqueous phase is the principal component, the aqueous phase containing water and a byproduct of agriculture or fermentation in sufficient quantities to fix fertilizer to seeds and an oil phase containing oil and emulsifiers; wherein the fixing agent contains aqueous phase 50-95% by weight and oil phase 5-50% by weight; and wherein the aqueous phase contains water and a byproduct of agriculture or fermentation at a weight ratio of 1:4-4:1.

2. The fixing agent according to claim 1, further comprising a preservative.

3. The fixing agent according to claim 1, further comprising a stabilizing agent.

4. The fixing agent according to claim 1, wherein said byproduct of agriculture or fermentation is molasses, vinasse or syrup, or a mixture thereof.

5. The fixing agent according to claim 1, wherein said oil is a biodegradable or readily biodegradable vegetable or animal oil or mineral oil.

6. The fixing agent according to claim 1, wherein said oil is a biodegradable or readily biodegradable vegetable or animal oil, white oil, or a mixture thereof.

7. The fixing agent according to claim 1, wherein the fixing agent contains aqueous phase 70-90% by weight and oil phase 10-30% by weight.

8. The fixing agent according to claim 1, wherein the aqueous phase contains water and a byproduct of agriculture or fermentation at a weight ratio of 3:7-7:3.

9. A fixing agent for fixing fertilizer to seeds, comprising:

an oil/water lamellar emulsion or suspension that fixes fertilizer to seeds, an aqueous phase being the principal component thereof, said aqueous phase containing water and a byproduct of agriculture or fermentation at a weight ratio of 1:4-4:1, and an oil phase containing oil and emulsifiers, wherein the fixing agent contains the aqueous phase as 70-90% by weight and the oil phase as 10-30% by weight.

10. The fixing agent according to claim 9, further comprising a preservative.

11. The fixing agent according to claim 9, further comprising a stabilizing agent.

12. The fixing agent according to claim 9, wherein said byproduct of agriculture or fermentation is molasses, vinasse or syrup, or a mixture thereof.

13. The fixing agent according to claim 9, wherein the aqueous phase contains water and a byproduct of agriculture or fermentation at a weight ratio of 3:7-7:3.

14. A fixing agent for fixing fertilizer to seed, comprising:

an oil/water lamellar emulsion or suspension wherein an aqueous phase is the principal component, the aqueous phase containing water and a byproduct of agriculture or fermentation, selected from molasses, vinasse or syrup, or a mixture thereof, in sufficient quantities to fix fertilizer to seeds, and an oil phase containing oil and emulsifiers, wherein the aqueous phase contains water and the byproduct of agriculture or fermentation at a ratio of 1:1 to 3:7 of water to agricultural byproduct.

15. The fixing agent according to claim 14, wherein the aqueous phase contains water and the byproduct of agriculture or fermentation at a weight ratio of 1:1.

* * * * *